April 20, 1926.

A. H. STEBBINS

CLASSIFIER

Filed May 4, 1925

INVENTOR:
Albert H. Stebbins
BY Rob't F. Harris
ATTORNEY

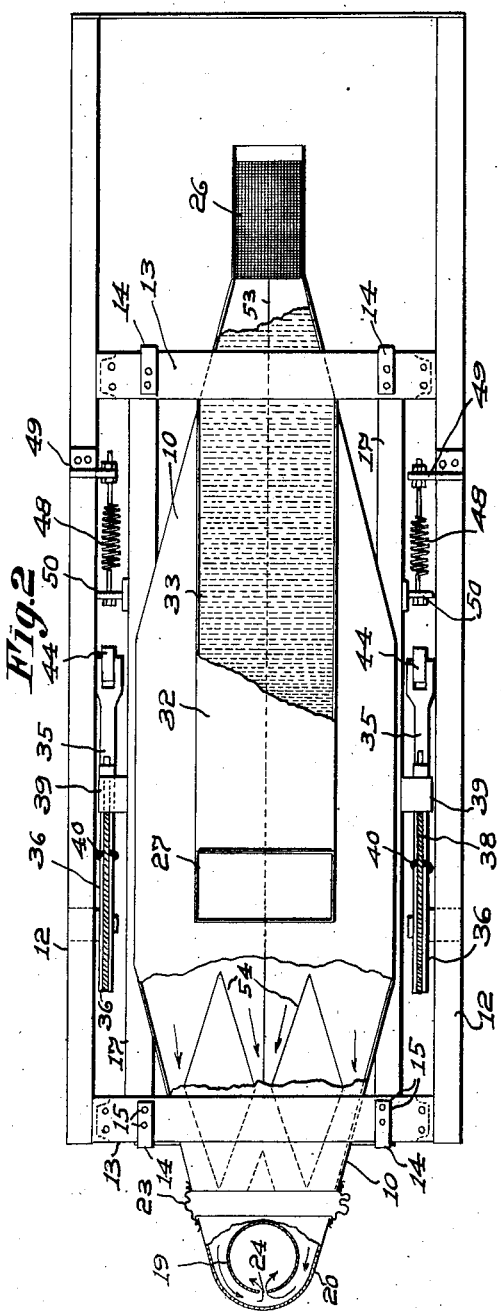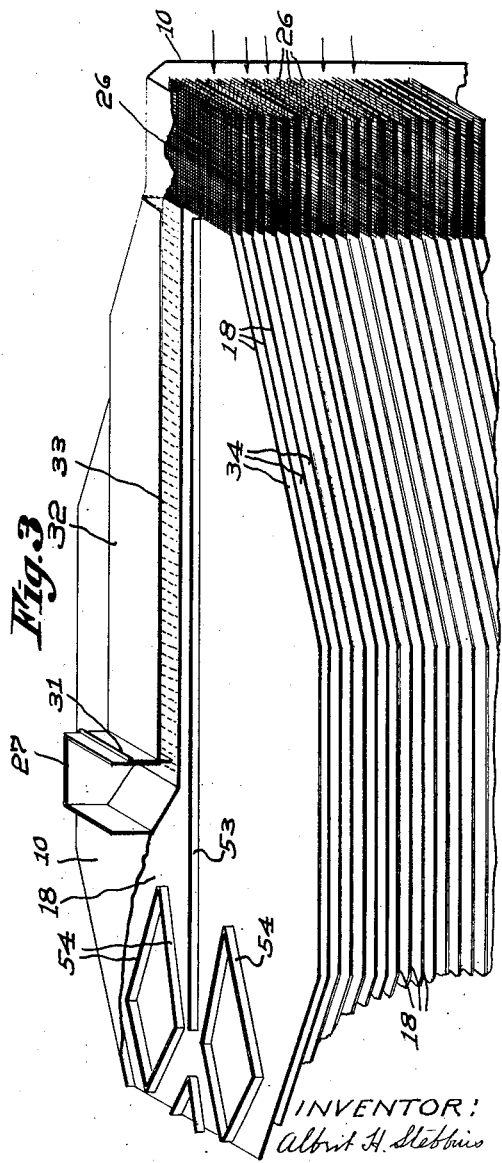

April 20, 1926.
A. H. STEBBINS
1,581,241
CLASSIFIER
Filed May 4, 1925    3 Sheets-Sheet 3
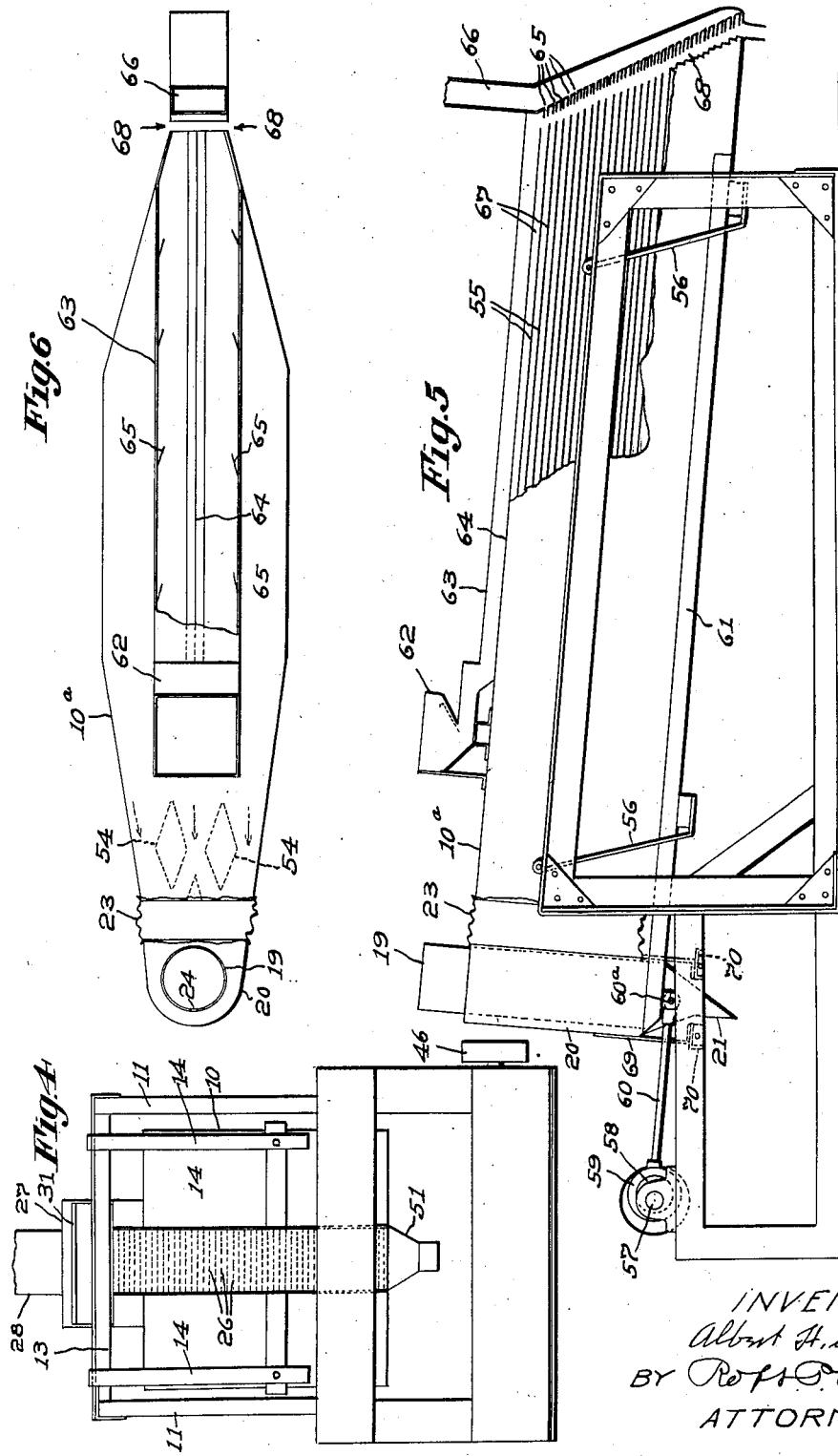
INVENTOR:
Albert H. Stebbins
BY Rob't P. Harris
ATTORNEY Patented Apr. 20, 1926.

1,581,241

UNITED STATES PATENT OFFICE.

ALBERT H. STEBBINS, OF LOS ANGELES, CALIFORNIA.

CLASSIFIER.

Application filed May 4, 1925. Serial No. 27,645.

*To all whom it may concern:*

Be it known that I, ALBERT H. STEBBINS, a citizen of the United States, and resident of Los Angeles, county of Los Angeles, and State of California, have invented an Improvement in Classifiers, of which the following description, in connection with the accompanying drawings, is a specification, like characters on the drawings representing like parts.

This invention relates to classifiers for treating fine materials by subjecting them repeatedly to the separating action of air currents.

In the separation of ores and other materials it is often desirable to treat fine dust like material to remove therefrom the very fine powder-like dust, and, in order to effect a complete separation of these fine materials they must be subjected repeatedly to a gentle separating force which will remove the very fine dust without removing the slightly heavier or coarser dust. The separation of these fine materials cannot be effected by a single treatment because if a force is employed that is strong enough to remove all of the very fine particles, it will also remove more or less of the slightly heavier or coarser particles.

The present invention therefore relates to a classifier which is so constructed that as the materials to be treated pass downwardly thru a casing they are subjected time and time again to the gentle separating action of air currents that pass thru the materials to carry off the lightest and finest particles, while leaving the slightly heavier and coarser particles.

One important feature of the invention resides in a casing having a large number of non-apertured floors mounted therein one above the other to form air passages between them. Currents of air are caused to pass thru the passages to carry the materials that are presented to the entrance to the passages into the same, and the heavier and coarser particles carried lengthwise of the passages by the air will settle therein while the very fine particles will remain suspended in the air and will pass out of the casing with the air.

The materials that settle in the passages upon the floors thereof may be removed by imparting a progressive vibratory movement to the casing to cause the materials to slide along the floors out of the passages, and the movement imparted to the materials on the floors is preferably in a direction opposite to that in which the air travels thru the passages.

As the materials that settle on the floor of one passage slide out of this passage under the action of the vibratory movement, they pass downwardly in front of the next passage below and are carried into this lower passage for retreatment. In this manner the heavier and coarser particles are carried successively into the various passages so that they are subjected time and time again to the gentle action of the air currents in order that the very fine particles may be completely removed from the slightly heavier particles.

Another feature of the invention resides in disseminators disposed adjacent the entrance to the different passages, and which serve to spread out or disseminate the materials and to direct them into the passages. The disseminators may be variously constructed and in one embodiment of the invention illustrated they constitute screens, while in another embodiment they comprise air jets.

Another feature of the invention resides in the construction of the casing whereby the entrance opening at one end is relatively narrow while an intermediate portion of the casing is considerably wider; this construction is desirable as it causes the strength of the air to decrease after entering the passages, to promote settling of the materials therein.

Other features of the invention and novel combination of parts in addition to the above will be hereinafter described in connection with the accompanying drawings, which illustrate good, practical forms of the invention.

In the drawings:—

Fig. 2 is a top plan view of Fig. 1 with parts of the casing broken away.

Fig. 3 is a perspective view of a number

Fig. 4 is an end view of the air intake end of the machine shown in Fig. 1.

Fig. 5 is a side view of a modified type of classifier, part of the casing being broken away, and Fig. 6 is a top plan view of Fig. 5.

Figure 1:
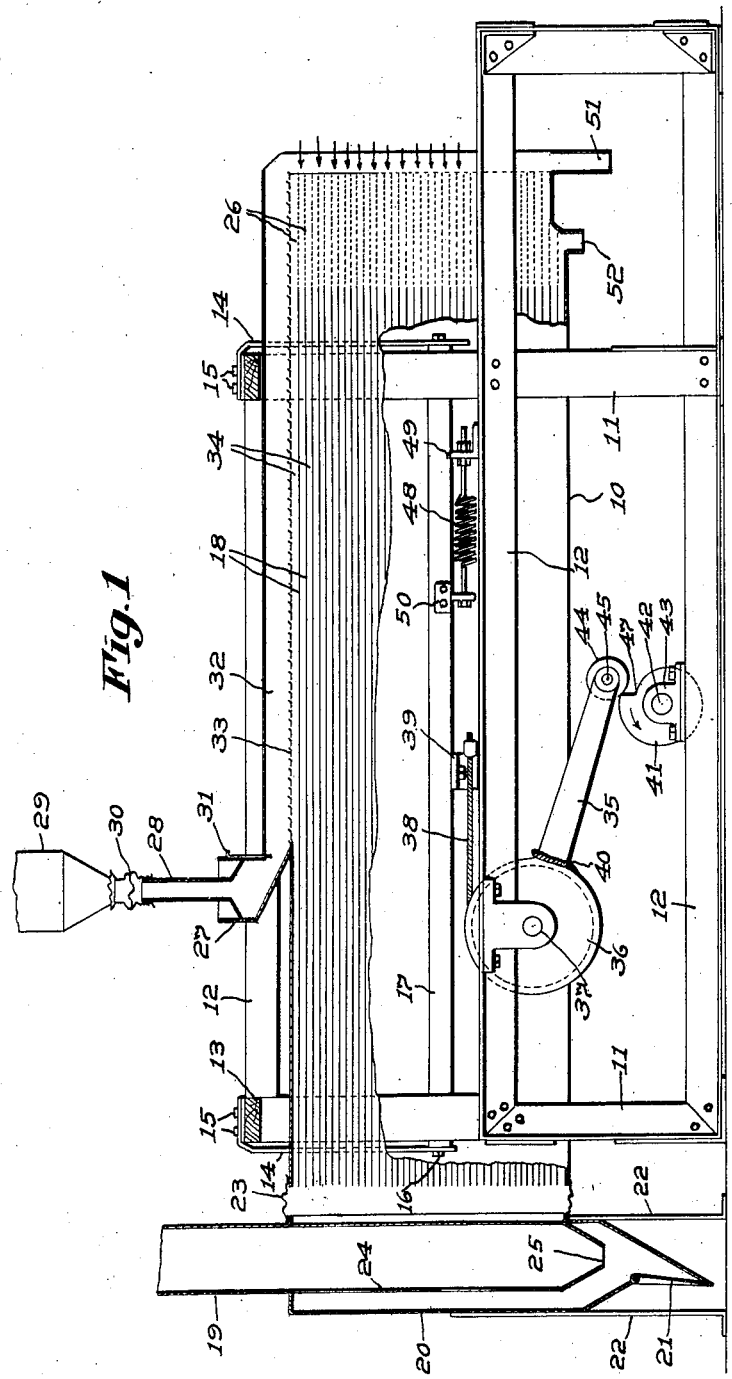
Fig. 1 is a side elevation of a classifier constructed in accordance with the present invention, part of the casing being broken away to disclose the interior thereof.

In the embodiment of the invention shown in Figs. 1 to 4 inclusive, the classifier is provided with a casing 10 having an air inlet opening at one end and an air discharge opening at its opposite end. This casing may be formed of sheet metal, or other material. It is desirable to impart vibratory movement to the casing 10 to promote travel of the materials lengthwise of the casing, and to this end the casing 10 is shown as suspended within a hollow frame for back and forth movement in the direction of its length. The supporting frame consists of uprights 11 having longitudinally extending beams 12 secured thereto, and the opposite sides of the frame thus formed are connected by transversely extending bars 13.

The casing 10 is conveniently supported for vibratory movement by flexible straps 14 the upper ends of which are secured at 15 to the transversely extending bars 13 at the upper part of the frame and the lower ends of these straps are secured at 16 to bars 17 rigidly secured to the opposite sides of the casing 10.

As stated the casing 10 has a large number of passages or compartments formed therein thru which air is passed to subject the materials repeatedly to the general separating action of a relatively slight air force, and in the construction shown a large number of floors or supporting surfaces 18 are mounted within the casing to extend lengthwise thereof thruout a substantial portion of the length of the casing and these floors are supported one above the other, as shown, to form air passages between them. The floors may be formed of plates or strips of sheet metal and preferably are not perforated, so that they present smooth surfaces upon which the heavier materials within the passages may settle, and along which these heavier materials may slide towards an end of the passages under the movement imparted to the casing 10.

In the construction shown in Figs. 1 to 4 inclusive, the right-hand end of the casing 10 is open thruout the height of the casing and at the opposite end of the casing is provided a suction pipe 19 which serves to draw air in thru the open end of the casing, as indicated by the arrows, and lengthwise of the casing thru the various passages formed by the floors 18. The suction pipe 19 is shown as extending downwardly into a receptacle 20 which forms a settling chamber in which the materials which settle may be discharged thru the gate 21 at the lower end of this receptacle, and in the present case the receptacle 20 is supported independently of the casing 10 by the legs 22, the arrangement being such that the receptacle 20 and suction pipe 19 do not partake of the reciprocatory movement imparted to the casing 10. A flexible connection 23 is provided between the left hand end of the casing 10 and a correspondingly shaped opening formed in the receptacle 20, so that the casing may move freely relatively to the receptacle while air is prevented from entering between the adjacent ends of these two chambers by the flexible covers. Air enters the suction pipe 19 thru a vertical slot 24 formed in the opposite side of this pipe from the casing 10, this construction being desirable as it causes the air to pass around the suction pipe before entering the same thru the slot 24, and prevents the air from rushing directly from the casing 10 into the suction tube. A relatively small opening 25 is provided at the lower end of the suction pipe so that the materials that settle therein may escape thru this opening into the hopper at the lower end of the receptacle 20.

It is desirable to provide means for spreading out or disseminating materials presented to the various entrances of the passages formed between the floors 18, and also to retard the movement of these materials downwardly thru the casing 10 so that they may be drawn into the various passages.

Various means to this end might be provided, and in Figs. 1 to 4 inclusive disseminators are provided in the form of screens 26 located at the right-hand end of the casing 10 and preferably in alignment with the various floors 18. The means for delivering the materials to be treated to the disseminators 26 may be variously constructed, and in Figs. 1 to 4 inclusive is shown as comprising a hopper 27 mounted upon the upper portion of the casing 10 and materials are fed to this hopper by a pipe 28, the upper end of which is connected to a receptacle 29 by the flexible tube 30.

The rate at which the materials escape from the hopper 27 may be controlled by adjusting the gate 31. The hopper 27 delivers the materials into a closed trough or conduit 32 upon the upper face of the casing, and the bottom 33 of this conduit is perforated and is shown as having upstanding lips adjacent the perforations which prevent excessively large particles and foreign matter from entering the perforations to clog the same. The materials that pass thru the apertures in the surface 33 lodge upon the uppermost floor or supporting surface 18 and slide along this floor, under the vibratory movement to be described, until these materials reach the uppermost screen or disseminator 26, whereupon they sift thru the screen and are carried into the uppermost air passage 34 by the air passing therethru.

The heavier and coarser materials will settle upon the floor of this passage, whereas the very light particles will remain suspended in the air and will pass entirely thru the passage and settle in the receptacle 20, or will be carried upwardly thru the suction pipe 19 with the air.

It is important that means be provided for removing from the various passages 34 the heavier materials that settle therein, and to this end, in the machine shown in Figs. 1 to 4 inclusive, means is provided for imparting a progressive vibratory movement to the casing 10 so that the materials resting upon the floors 18 will travel lengthwise of the casing in a right-hand direction. A simple means for imparting the desired movement to the casing consists of the actuating levers 35 at each side of the casing, and having relatively large, rounded heads 36 that are pivotally supported by stub shafts 37 secured to the opposite sides of the supporting frame. The head 36 of each lever is provided with a cable receiving groove adapted to receive the cable 38, one end of which is secured to a bracket 39 rigidly fastened to the rail 17 of the casing 10 and the other end of this cable is looped about or otherwise secured to the lever 35 as at 40. Rocking movement is imparted to the levers 35 by cams 41 secured to an operating shaft 42 which is rotatably supported beneath the casing 10 by the journal brackets 43. The outer end of each lever 35 is provided with a small wheel or roller 44 secured to the lever by a pin 45. The arrangement is such that as the operating shaft 42 is rotated by driving means such as a belt pulley 46 the cams 41 are turned in the direction indicated by the arrow in Fig. 1. As the cams act against the rollers 44 they will rock the levers 35 upwardly to tension the cables 38 and pull the casing 10 in a left-hand direction, and as the reduced portion 47 of each cam passes under the roller 44 it will suddenly release the levers 35 to permit them to rock in the opposite direction. Springs 48 positioned at each side of the casing 10 are provided for urging this casing in a right-hand direction, and one end of each spring is adjustably secured to a bracket 49 fastened to a rail 12, while the opposite end of each spring is secured to the bracket 50 fastened to the brace 17 of the casing 10.

The operating mechanism just described is such that the casing 10 is continuously urged in a right-hand direction by the springs 48 and as the enlarged portion of each cam 41 passes under the rollers 44 of the operating levers, these levers will be rocked upwardly to pull the casing 10 in a left-hand direction, and as the reduced portion 47 of each cam passes under these rollers, the levers will be suddenly released to permit the casing to move in a right-hand direction under the action of the springs 48, and after moving in this direction a short distance, the movement will be suddenly checked by the cables 38 becoming taut, thus imparting the desired progressive movement to the materials upon the floors 18 to advance the materials in the right hand direction.

The movement just described will serve to cause the materials which settle upon the floors 18 to slide along the floors towards the entrance openings of the passages 34, and upon reaching the disseminators or screens 26, will pass downwardly, to be carried into the other passages by air currents, for retreatment. In this manner the heavier and coarser particles are carried successively into one passage 34 after another, so that they are subjected time and time again to the gentle action of the air currents to completely remove therefrom the finer particles.

The very large particles and foreign materials that are rejected by the upper screen 33 escape from the delivery end of this screen thru the discharge pipe 51 at the right hand end of the casing. The heavier and coarser particles which have been treated time and time again in the various passages 34 without being carried entirely thru these passages by the currents of air are finally discharged from the casing 10 thru the opening 52.

The floors 18 are preferably placed in close proximity to each other, say from one-quarter to one-half of an inch apart, so that a large number of floors or supporting surfaces will be mounted in the casing 10 to form a number of passages 34 therein, in which the materials will be retreated many times.

It is desirable to provide air currents traveling thru the passages 34 which are stronger at the entrance to these passages than they are in an intermediate portion of the passages, and the casing 10 is therefore shown in Figs. 2 and 3 as having a relatively wide intermediate portion with tapered sides that slope towards the opposite end of the casing. As a result of this construction the air passing thru the passages 34 may spread out within the passages, thus reducing its velocity and promoting settling of the materials within the passages.

It is desirable that the air currents at the opposite sides of a passage 34 have substantially the same strength, and in order to prevent the air currents from flowing laterally in a passage, it may be desirable to provide the rib 53 extending lengthwise thereof, and it may also be desirable to provide guides or partitions 54 within the passages to control the flow of the air therethru.

In the construction shown in Figs. 5 and 6, the casing 10ᵃ, instead of being supported horizontally, as shown in Fig. 1, inclines in the direction of its length to promote the flow of materials upon the various floors 55 therein in a right-hand direction. The casing 10ᵃ in this modified construction is supported by straps 56 for reciprocatory movement in the direction of its length. Since the inclination of the floors or supporting surfaces 55 will tend to cause the materials that settle on the floors to slide in a right-hand direction, it is unnecessary to impart a progressive vibratory movement to the casing 10ᵃ. Any suitable means for imparting a simple reciprocatory movement to the casing 10ᵃ may therefore be employed in the construction shown in Figs. 5 and 6. The operating means disclosed consists of an operating shaft 57 provided with a pair of eccentrics 58 secured to the shaft 57 at the opposite sides of the casing, and these eccentrics rotate in eccentric heads 59. Operative movement is imparted from the heads 59 to the casing 10ᵃ by shafts 60, each having an end pivotally fastened at 60ᵃ to beams 61 rigidly secured to the opposite sides of the casing 10ᵃ.

In the modification shown in Figs. 5 and 6 the feed hopper 62 delivers the materials to be treated to a trough 63 the floor of which 64 is not perforated as in Fig. 1, but presents a smooth surface along which the materials may slide until they reach the right-hand end of the same; this trough is preferably provided with a central riffle 64 extending longitudinally thereof and riffles 65 extending inwardly from the side of the trough, and these riffles serve to prevent the materials from flowing transversely across the trough.

In the construction shown in Figs. 5 and 6, the screen disseminators 26 of Fig. 1 have been replaced by air jets 65 which are supplied with air under pressure by the pipe 66. The arrangement is such that as the materials are delivered to the right-hand end of the casing by the trough 63, they meet blasts of air from the air jets 65 which serve to spread out or disseminate the materials and direct them into the passages 67 between the floors 55, whereupon the materials will be carried lengthwise of these passages, and the heavy materials will settle therein, as in the construction shown in Figs. 1 to 4 inclusive, while the lighter materials will be carried thru these passages and will settle in the receptacle 20, or will be carried upwardly in the suction pipe 19, as above described. The receptacle 20 is rigidly supported by legs 69 the lower ends of which are secured to cross beams 70 of the supporting frame, and as a result the receptacle 20 and suction pipe 19 do not partake of the vibratory movement imparted to the casing 10ᵃ.

It should be noted that the modified construction shown in Figs. 5 and 6 is entirely free from screens, so that there are no screens to become clogged in this form of classifier. It may be that the air jets 65 will not supply sufficient air to effect the desired separation of the materials, and the casing 10ᵃ is therefore preferably provided with slots 68 formed in its opposite walls at the entrance to the passages 67 thru which an additional supply of air may enter under the suction of the pipe 19.

It will be understood that in the classifier shown in Figs. 1 to 4 inclusive, and also in the modified construction shown in Figs. 5 and 6, the heavier and coarser materials that settle in one passage will slide along the floor of the same out of the passage and then will be immediately carried into a lower passage for further treatment, so that the same materials while passing downwardly thru the casing 10 or 10ᵃ will be carried successively into a large number of passages and will be subjected time and time again to the gentle action of the air which will serve to completely remove the very fine particles, without carrying off the slightly heavier or coarser particles.

What is claimed is:—

1. An air classifier for treating fine dust like materials, comprising in combination, a casing, a series of floors mounted within the casing one above the other in close proximity to each other to form air passages between them, means for producing air currents passing lengthwise of the casing through the air passages, means for delivering the materials to be treated to the entrance of the passages to be carried into the passages by the air so that the heavier particles will settle out of the air upon the floors of the passages while the finer particles that remain suspended in the air are carried entirely through the passages, and means for causing the heavier particles that settle upon the floors to slide out of the passages.

2. An air classifier for treating fine dust like materials, comprising in combination, a casing, a series of non-aperture floors mounted within the casing one above the other in close proximity to each other to form air passages between them, means for producing air currents passing lengthwise of the casing through said air passages, means for delivering the materials to be treated to the entrance of the passages to be carried into the passages by the air so that the heavier particles will settle out of the air upon the floors of the passages while the finer particles that remain suspended in the air are carried through the passages, and means for vibrating the floors to advance the materials that settle upon the floors out of the passages.

3. An air classifier for treating fine materials, comprising in combination, a casing, a series of floors mounted within the casing one above the other in close proximity to each other to form air passages between them, means for producing air currents passing in the same direction through the various passages, means for delivering the materials to be treated to the upper part of the casing to pass downward in front of the passages to be carried into the passages by the air so that the heavier particles will settle upon the floors of the different passages while the lighter particles that remain suspended in the air will be carried through the passages, a disseminator adjacent the entrance to each passage for spreading out the materials and directing them towards the entrances, and means for removing from the passages the heavier materials that settle therein.

4. An air classifier for treating fine materials, comprising in combination, a casing, a series of floors mounted within the casing one above the other a fraction of an inch apart to form relatively long air passages between them, means for producing air currents passing lengthwise of the casing through said passages, means for delivering the materials to be treated to the entrance of the upper passage to be carried into the passage by the air so that the heavier particles will settle therein while the lighter particles that remain suspended in the air are carried therethrough, and means for operating the floors so that the particles that settle upon a floor will slide along the same out of the passage and pass downward in front of the passage below to be carried therein for retreatment.

5. An air classifier for treating fine materials, comprising in combination, a casing, a series of floors mounted within the casing one above the other in close proximity to each other to form air passages between them, means for producing air currents through the passages, means for delivering the materials to be treated to the upper part of the casing to pass downward in front of the passages so that they are carried into the passages by the air that the heavier particles may settle upon the floors of the different passages while the lighter particles that remain suspended in the air will be carried through the passages, a series of air jets at the entrance of the passages for disseminating the materials and directing them into the passages, and means for removing from the passages the heavier materials that settle on the floors thereof.

6. An air classifier for treating fine materials, comprising in combination, a casing, a series of floors extending lengthwise of the casing and mounted one above the other in close relation to form air passages between them, means for producing air currents through the passages, means for delivering the materials to be treated to the uppermost passage to be carried therein by the air that the heavier particles may settle therein, means for delivering the materials that slide out of the entrance of one passage to the next passage below for retreatment, and means for actuating the casing to cause the materials that settle upon the floors to slide along the same toward said entrances.

7. An air classifier for treating fine materials, comprising in combination, a casing, a series of floors mounted within the casing one above the other in close relation to each other to form air passages between them, means for producing air currents through the passages, means for delivering the materials to be treated to the entrance of the passages to be carried into the passages by the air so that the heavier particles will settle out of the air upon the floor while the lighter particles that remain suspended in the air pass entirely through the passages, air guides within the passages and spaced from the sides thereof, and means for removing from the passages the heavier materials that settle there.

8. An air classifier for treating fine materials, comprising in combination, a casing, a series of floors mounted within the casing one above the other in close relation to each other to form air passages between them, a trough at the upper part of the casing for delivering the materials to be treated to the entrance of the passages and of sufficient length to promote stratification of the materials as they travel along the trough, means for producing air currents through the passages to carry the materials into the passages so that the heavier particles may settle on the floors of the passages while the lighter particles are carried by the air entirely through the passages, and means for removing from the passages the heavier materials that settle therein.

9. An air classifier, comprising in combination, a casing having an air inlet opening at one end and having its width increasing in the direction in which the air travels thru the casing that the strength of the air may decrease as it travels lengthwise of the casing, a series of floors extending longitudinally of the casing and mounted one above the other to form air passages between them, means for delivering the materials to be treated to the entrance of the passages, means for producing air currents passing lengthwise of the casing thru the passages, and means for removing from the passages the heavier particles that settle therein.

10. An air classifier, comprising in combination, a casing, a series of supporting surfaces extending lengthwise of the casing and mounted one above the other to form air passages between them, a trough at the upper part of the casing for delivering the materials to be treated to the supporting surfaces and of sufficient length to promote stratification of the materials as they travel along the trough, riffles in the trough for preventing the materials from piling up against a side of the trough, and means for producing air currents thru the passages for carrying the materials lengthwise thereof to promote separation of the materials.

In testimony whereof, I have signed my name to this specification.

ALBERT H. STEBBINS.